July 28, 1942.   S. R. NAYSMITH   2,291,490
COMBINED WIRING CONDUIT AND FLUORESCENT LAMP FIXTURE
Filed Jan. 31, 1941   2 Sheets-Sheet 1
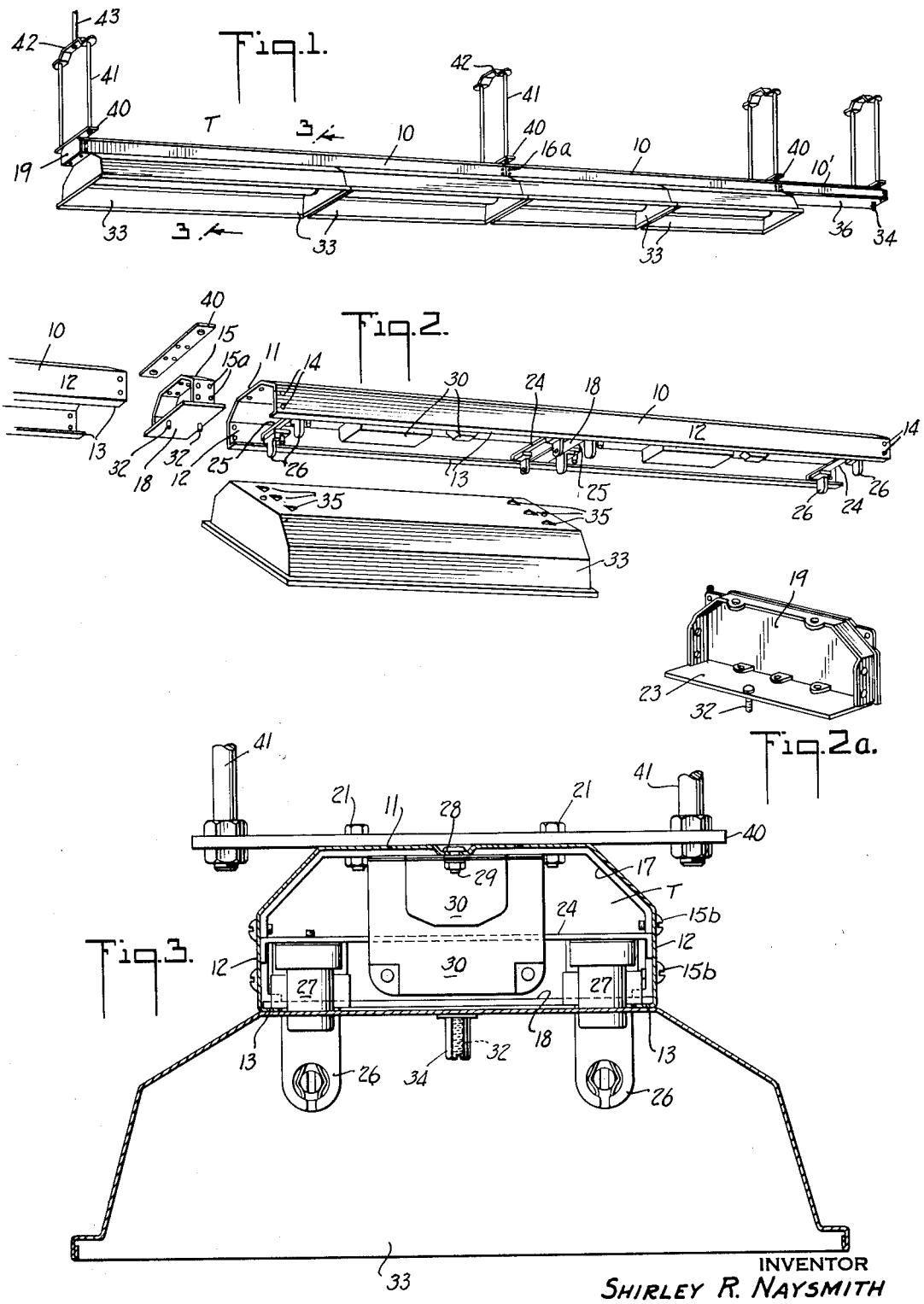
INVENTOR
SHIRLEY R. NAYSMITH
BY
ATTORNEY

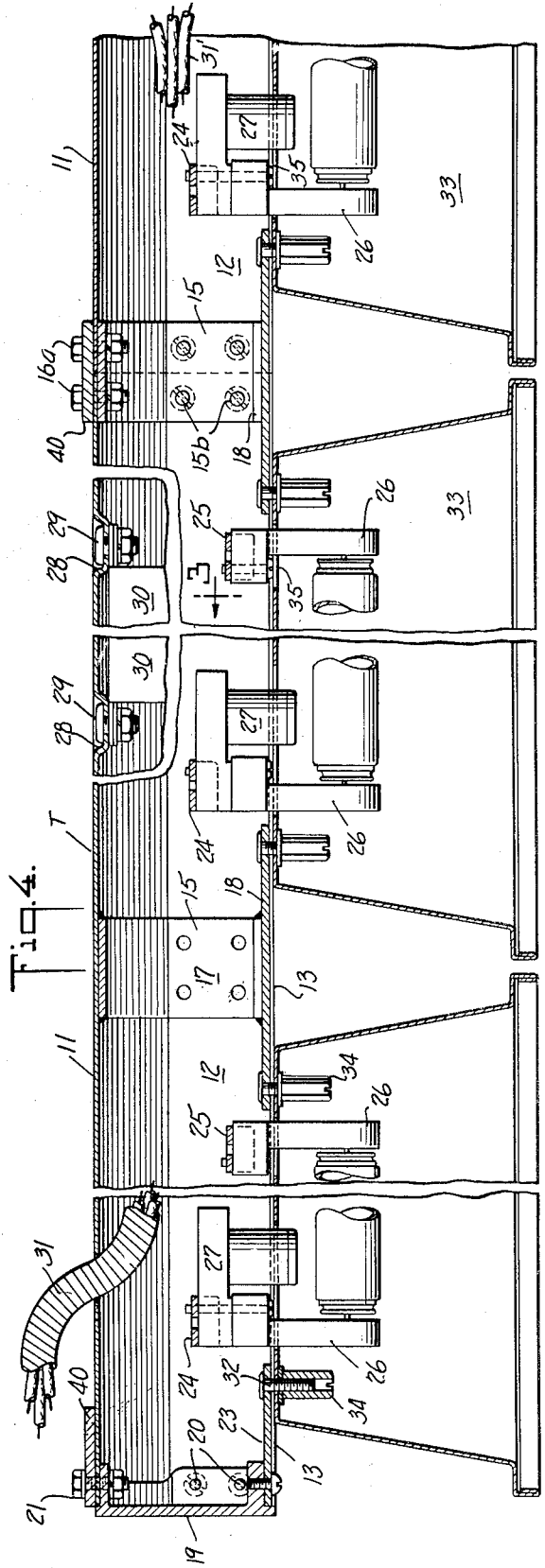

Patented July 28, 1942

2,291,490

UNITED STATES PATENT OFFICE 2,291,490

COMBINED WIRING CONDUIT AND FLUORESCENT LAMP FIXTURE

Shirley R. Naysmith, Meriden, Conn., assignor to The Miller Company, Meriden, Conn., a corporation of Connecticut Application January 31, 1941, Serial No. 376,779

9 Claims. (Cl. 240—78)

The present invention relates to combined wiring conduits and fluorescent lamp fixtures, and is more particularly directed toward structures suitable for use in the installation of a line of lighting equipment over long areas.

Where it has been necessary to light long narrow areas, or a plurality of contiguous long narrow areas, it has been customary to install permanent wiring and spaced outlets to which individual fixtures or luminairs would be connected. Where such wiring has been installed for fixtures of the incandescent lamp type and a change to fluorescent lighting equipment is desired, the spacing of the outlets restricts the location of the fluorescent units, or it is necessary to move the outlets or add outlets at considerable expense. In new installations the provision of permanent wiring and outlets for each fixture is a substantial portion of the cost of the complete lighting equipment layout and apparatus.

In my copending application Serial No. 376,780 filed January 31, 1941, concurrently herewith, I have discussed an improved layout whereby the wiring expense is substantially reduced and have illustrated apparatus suitable for use therein, this apparatus having long sectionalized wiring conduits through which a very large portion of the wiring is passed, and these conduits support the fluorescent lighting equipment, including auxiliaries, lamps and reflectors.

The present invention relates to such apparatus and more particularly to a form of such apparatus wherein the length of wiring conduit sections is such as to accommodate a single fluorescent lamp with its auxiliaries and reflector, or a multiple of such length so that two, or more, lamps may be accommodated end to end. Where made for 48" lamps a single lamp length section may be 52¾" long and the two lamp length section double this. Each section may also accommodate two lamps side by side or three lamps side by side.

With these sections a wiring channel may be assembled by suitable coupling devices to have a length of several hundred feet and accommodate all the wiring to distribute power from a single central cable supply to all the equipment installed. The distribution of lighting equipment along the channel may be varied to suit conditions and additional equipment readily installed up to the maximum capacity. It is also possible to provide short fixtures of one lamp length or double this.

The present invention also relates to supports or suspensions whereby the wiring and lighting equipment may be secured to the ceiling or to cables stretched along or across the area to be lighted.

Other and further objects will appear as the description proceeds.

The accompanying drawings show, for purposes of illustrating the present invention, an embodiment in which the invention may take form, together with modifications of certain parts, it being understood that the drawings are illustrative of the invention rather than limiting the same.

In these drawings:

Figure 1 is a perspective view illustrating a multisection trough suspended below a ceiling;

Figure 2 is an exploded view showing a double length section of the trough, together with coupling device, fragment of another section, and a reflector;

Figure 2a is a perspective view illustrating an end member for closing the end of the trough;

Figure 3 is a cross sectional view taken on the line 3—3 of Figures 1 and 4;

Figure 4 is a central longitudinal sectional view with parts broken away;

Figure 5 is a perspective view of a coupling device at a larger scale than Figure 2;

Figure 6 illustrates the support of the trough from a longitudinal cable;

Figure 7 is a diagrammatic view illustrating the supporting of a trough from a transverse cable; and Figure 8 is a diagrammatic view illustrating the supporting of a trough from two parallel cables.

The wiring conduit illustrated in the drawings and designated by the letter T employs a plurality of sections 10 and 10' which are of unit length, as indicated at 10', or of twice this length, as indicated at 10. Each section is formed of sheet metal and of inverted trough shaped configuration, as will be apparent from the drawings, and has a top portion 11, sides 12, 12 and inwardly bent marginal flanges 13, 13.

The ends of the sections 10 and 10' are provided with holes 14 at the sides and top as will be apparent from Figure 2. The adjacent ends of two sections are secured together by a coupling device 15, shown in Figures 2 and 5, this device having tapped holes 15a at the sides to receive screws 15b which pass through the side holes 14 and by bolts 16a which pass through the upper holes 16b and the top holes 14. The coupling devices 15 are made of heavy sheet metal straps 17 shaped to fit inside the channel, and cross plates 18 welded to the straps 17 and adapted to stiffen the channel.

A similar coupling member 15 is employed at the middle of the double length section to stiffen it and is secured in place by welding, as indicated in Figure 4.

The outer ends of the wiring conduit are closed by end plates 19, as indicated in Figures 2a and 4, these end plates being secured in place by screws indicated at 20 and bolts indicated at 21. The end members 19 carry stiffening plates 23 disposed above the marginal flanges 13, as will be clear at the left of Figure 4. It will thus be seen that at the ends of the wiring channel there will be a plate 23, while at regular intervals along the length of the wiring channel there will be a stiffening plate 18. The plate 18 is of twice the width as the plate 23 so that uniform length openings are provided.

Cross straps 24 and 25 are secured to the channel walls adjacent the stiffening plates 23 and 18, as indicated in the drawings. The straps 24 are at a higher elevation than the straps 25 and are adapted to carry one, two or three fluorescent lamp holders 26 with starters indicated at 27, while the straps 25 carry the same number of fluorescent lamp holders 26 without starters. Usually two lamp holders are carried by each pair of straps 24 and 25. These lamp holders are spaced the proper distance to accommodate fluorescent lamps, and when these lamps are of the 48" size the overall length of a single lamp length section is about 52¾", and the double lamp length section is about 105½" long. The back 11 of the trough is countersunk, as indicated at 28, Figure 3, to receive welding bolts 29, and these bolts support the various fluorescent lamp auxiliaries indicated at 30. The number and distribution of the lamp auxiliaries, together with their wiring to the lamp sockets, will follow standard practice depending upon the number of lamps used and the circuits employed.

It will be noted that the sections which make up the wiring conduit are considerably wider than the auxiliaries so that plenty of room is provided between the auxiliaries and the side walls of the wiring conduit for wiring to pass lengthwise of the conduit and the provision of the wide structure together with the bottom stiffening flanges provides a conduit which has great strength and rigidity so that it may be supported at convenient spaced intervals. Each length of wiring conduit provides a structure which is very stiff in both vertical and horizontal directions.

Each section of the wiring conduit, whether of one or two lamp lengths, may be preassembled at the factory and carry all the wiring necessary to supply the lamps to be carried thereby. Any number of the sections may be coupled together by using a sufficient number of coupling elements 15, and thus the wiring conduit may have an indefinite length. A suitable cable, indicated at 31, may supply power to the wiring conduit at any convenient point along its length and wires 31' are carried through the entire length of the conduit supported above the stiffening plates and cross straps, and connected by splicing to the other wiring.

The stiffening plates 13 and 18 are provided with downwardly extending studs 32. Reflectors 33 of trough shaped cross section may be secured to these studs by nuts indicated at 34. These reflectors are apertured, as indicated at 35, to accommodate the lamp holders. The reflectors act as covers for the spaces between the stiffening cross members. If it is desired to omit the lamps and reflectors at any point along the wiring channel, the space may be closed by a smooth plate or cover, indicated at 36 in Figure 1.

The wiring conduit is supported from above by devices suitable for the location. In Figure 1 these include cross straps 40 secured to the trough by the bolts 16a and 21, hanger rods 41 and upper cross straps 42 adapted to be fastened to rods 43. In Figure 6 the upper cross straps 42 may be secured to a longitudinally extending cable 44. In Figure 7, cross straps 45 are substituted for the straps 40 and secured to transverse cables 46 which pass through cable clamps 47 and hook 48.

In Figure 8 the cable clamps 47 are turned 90° and cables 49 are run lengthwise.

Other forms of construction illustrative of the broader aspects of the present invention are shown in the concurrently filed application above referred to.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A wiring conduit for fluorescent lighting equipment comprising a plurality of sheet metal sections of inverted trough shaped cross section, each having inwardly extending stiffening flanges of substantial width, interiorly disposed connecting straps bridging the joints between adjacent sections and fixedly secured to the sides and tops of the sections to hold the sections in alignment both horizontally and laterally and form a trough, relatively short horizontal plates immediately above the flanges and disposed at intervals along the trough whereby elongated spaces are provided between adjacent plates corresponding to lamp length, means for attaching said plates to the trough to form stiffening members for the trough, fluorescent lamp sockets supported near the edges of the plates and projecting downwardly from the trough, fluorescent lamp auxiliaries supported from the top of the trough and extending lengthwise of the trough, the trough being substantially wider than the auxiliaries to provide wiring space lengthwise of the trough and alongside the auxiliaries, the spacing between the stiffening flanges being substantially greater than the width of the auxiliaries so that the sockets may be arranged in pairs adjacent each plate and spaced apart to accommodate lamps side by side, and covers secured to adjacent plates to form an enclosing passage for the wiring.

2. A wiring conduit such as claimed in claim 1, having transversely extending spaced cables secured to the trough.

3. A wiring conduit such as claimed in claim 1, having a longitudinally extending messenger cable supporting the trough at intervals.

4. A wiring conduit such as claimed in claim 1, wherein each cover is apertured for the lamp sockets supporting a lamp and is in the form of a rectangular reflector of inverted trough shaped cross section with closed ends beyond the sockets received therein.

5. A fluorescent lighting fixture comprising an inverted sheet metal trough having inwardly extending stiffening flanges of substantial width, interiorly disposed straps fixedly secured to the sides and tops of the trough at its ends and provided with end plates to close the ends of the trough, relatively short horizontal plates fixedly secured in place immediately above the flanges and near the ends of the trough whereby an elongated space is provided between the plates corresponding to lamp length, pairs of fluorescent lamp sockets supported near the edges of the plates, the sockets projecting downwardly from the trough and being spaced apart to accommodate lamps side by side, a fluorescent lamp auxiliary supported from the top of the trough and extending lengthwise of the trough, the trough being substantially wider than the auxiliary to provide wiring space lengthwise of the trough and alongside the auxiliary, and an inverted trough shaped reflector secured to the plates, the reflector being apertured for the lamp sockets.

6. A lighting fixture such as claimed in claim 5, wherein the sockets are secured to cross straps attached to the trough walls.

7. A lighting fixture such as claimed in claim 5, wherein each plate has a downwardly extending threaded stud extending through the top of the reflector.

8. A lighting fixture such as claimed in claim 5, having cross straps secured to the top of the trough, rods extending upwardly from the ends of the cross straps, and upper cross straps secured to the rods so that the trough may be suspended from these upper straps.

9. A fluorescent lighting fixture comprising an inverted sheet metal trough having inwardly extending stiffening flanges of substantial width, interiorly disposed straps fixedly secured to the sides and tops of the trough at its ends and provided with end plates to close the ends of the trough, three relatively short horizontal plates fixedly secured in place immediately above the flanges, one plate near each end of the trough and the other at the center of the trough whereby two elongated spaces are provided between adjacent plates each corresponding to lamp length, fluorescent lamp sockets supported near the edges of the plates and projecting downwardly from the trough, fluorescent lamp auxiliaries supported from the top of the trough and extending lengthwise of the trough, the trough being substantially wider than the auxiliaries to provide wiring space lengthwise of the trough and alongside the auxiliaries, the spacing between the stiffening flanges being substantially greater than the width of the auxiliaries so that the sockets may be arranged in pairs adjacent each plate and spaced apart to accommodate lamps side by side, two covers secured to the plates to form an enclosing passage for the wiring, each cover being in the form of an inverted rectangular reflecting trough with downwardly and outwardly divergent ends, the adjacent ends of the reflecting troughs being close together below the middle of the central plate.

SHIRLEY R. NAYSMITH.